United States Patent
Agarwal et al.

(10) Patent No.: US 6,451,092 B2
(45) Date of Patent: Sep. 17, 2002

(54) SYSTEM AND PROCESS FOR AGGLOMERATION AND PROCESSING OF CARBONACEOUS FINES AND DUST

(75) Inventors: Pradeep Agarwal, Laramie, WY (US); Paola De Filippis, Rome (IT); Temi M. Linjewile, Laramie, WY (US); John B. Agnew, Glen Osmond (AU); Henry Plancher, Laramie, WY (US)

(73) Assignee: University of Wyoming, Laramie, WY (US)

( * ) Notice: Subject to any disclaimer, the term of this patent is extended or adjusted under 35 U.S.C. 154(b) by 32 days.

(21) Appl. No.: 09/768,714

(22) Filed: Jan. 24, 2001

Related U.S. Application Data

(60) Provisional application No. 60/177,829, filed on Jan. 25, 2000.

(51) Int. Cl.$^7$ ............................................. B01D 47/00
(52) U.S. Cl. ........................... 95/195; 44/620; 95/205; 96/234; 210/711; 210/723
(58) Field of Search .................... 95/195, 196, 205, 95/154; 96/234, 235, 240, 241; 44/620; 210/711, 710, 723, 770

(56) References Cited

U.S. PATENT DOCUMENTS

| | | | |
|---|---|---|---|
| 2,835,562 A | * | 5/1958 | Boyer et al. |
| 2,980,522 A | * | 4/1961 | Dille et al. |
| 3,954,662 A | | 5/1976 | Salyer et al. |
| 4,065,385 A | * | 12/1977 | Atkay et al. |
| 4,209,301 A | * | 6/1980 | Nicol et al. |
| 4,264,453 A | * | 4/1981 | Mraovich |
| 4,269,614 A | * | 5/1981 | Shelstad |
| 4,316,811 A | | 2/1982 | Burns et al. |
| 4,380,459 A | | 4/1983 | Netting |
| 4,402,707 A | | 9/1983 | Wunderlich |
| 4,417,992 A | | 11/1983 | Bhattacharyya et al. |
| 4,477,353 A | * | 10/1984 | Messer |
| 4,540,484 A | * | 9/1985 | McCarthy |
| 4,544,490 A | * | 10/1985 | Erickson et al. |
| 4,561,905 A | * | 12/1985 | Kittle |
| 4,737,305 A | | 4/1988 | Dohner |
| 5,194,174 A | | 3/1993 | Roe et al. |
| 5,215,784 A | | 6/1993 | Tippett et al. |
| 5,310,494 A | | 5/1994 | Bennett |
| 5,439,608 A | | 8/1995 | Kondrats |
| 5,458,786 A | * | 10/1995 | Yoon et al. |
| 5,527,482 A | | 6/1996 | Pullen et al. |
| 5,587,085 A | * | 12/1996 | Yoon et al. |
| 5,595,782 A | | 1/1997 | Cole |
| 2002/0014155 A1 | * | 2/2002 | Agarwal et al. |

* cited by examiner

Primary Examiner—Duane S. Smith
(74) Attorney, Agent, or Firm—Emery L. Tracy

(57) ABSTRACT

A system and process for agglomerating and processing carbonaceous fines is provided. The process includes powdering the carbonaceous fines, mixing the powdered carbonaceous fines with an organic liquid creating a slurry, adding a predetermined amount of an aqueous electrolyte to the slurry creating agglomerated particles, settling the large agglomerated particles resulting in a settled mixture of agglomerated coal fines and reagent liquor, and separating the agglomerated coal fines from the reagent liquor.

20 Claims, 2 Drawing Sheets

A schematic diagram of system, Case A, for agglomeration and recovery of carbonaceous particles

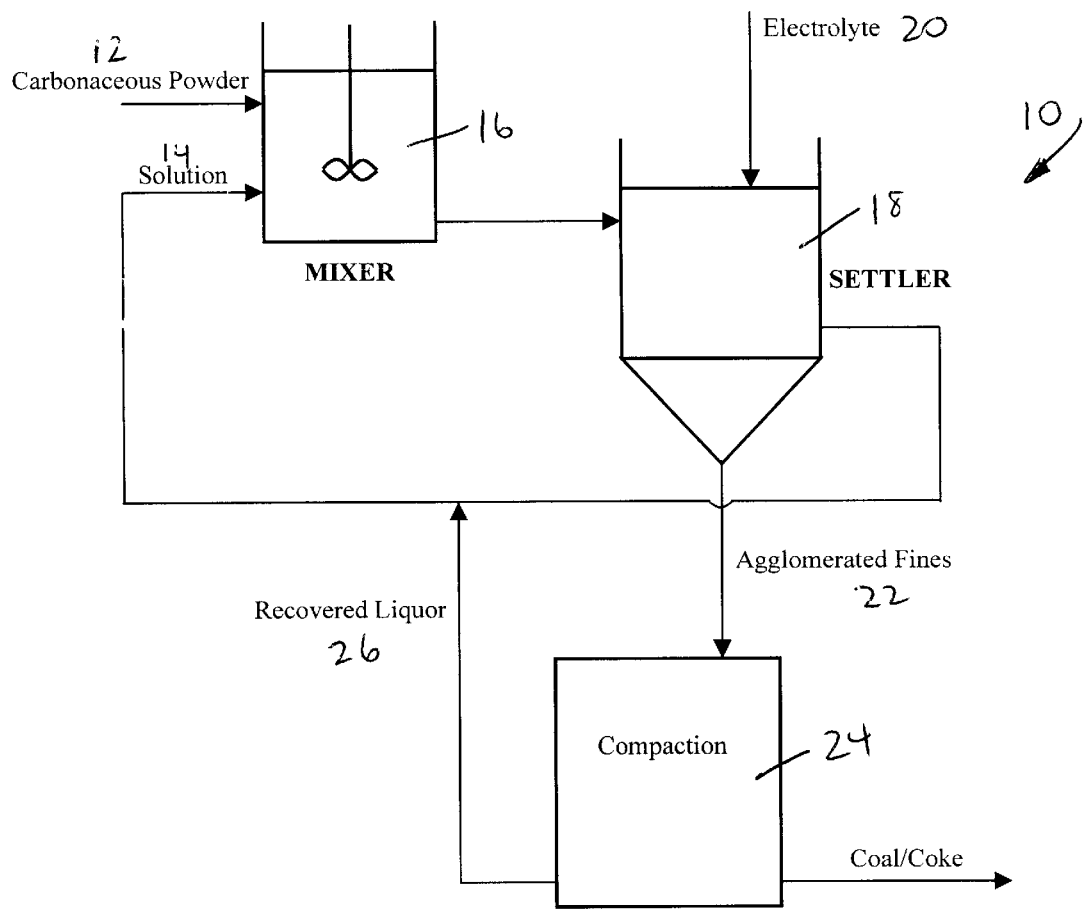
Figure 1. A schematic diagram of system, Case A, for agglomeration and recovery of carbonaceous particles Figure 2: Schematic diagram of the system configuration for on-line dust suppression, Case B

SYSTEM AND PROCESS FOR AGGLOMERATION AND PROCESSING OF CARBONACEOUS FINES AND DUST The present application is a continuation of provisional patent application Ser. No. 60/177,829, filed on Jan. 25, 2000, entitled "Process for Agglomeration and Processing of Carbonaceous Fines and Dust".

BACKGROUND OF THE INVENTION

1. Field of the Invention

This invention relates generally to a system and process for the agglomeration of carbonaceous particles and, in particular, it relates to the agglomeration of coal and coke fines, collected in cyclones, bag houses and other particle separation systems, in a slurried medium. The present invention further relates to the agglomeration of potential fugitive carbonaceous dust in process/mining and transportation environment through application a spray. The system of additives described herein, mixed in varying proportions, can be used for the above and related applications for recovery, suppression and utilization of carbonaceous fines and dust.

2. Description of the Prior Art

Coal dust is a generally unwanted but inevitable fact of life in most phases of coal utilization technology. It is known that powdered coal, i.e., coal dust, is produced in great quantities during mining of coal, during its handling before and after shipment, and during shipment and storage. The coal powder is the result of the mechanical effects of mining and grinding processes. Similarly, the transport or handling of coal has the effect of inducing contact between large pieces of coal and results in the creation of fines. Coal powder is also due to weathering and oxidation of stored coal.

The formation of powdered coal leads to several significant problems. Powdered coal can lead to environmental disturbances, including both threats to health and vegetation and aesthetic damage. Powdered coal can permeate the air of mining sites or other work sites and is highly flammable and explosive. An additional problem is that when powdered coal cannot be used, its economic value and energy value is totally lost. For these and other reasons, systems for collecting and reducing the dispersal of coal dust must be used.

In the past, the principal means relied on for abatement of fugitive dust from manufacturing facilities are cyclones, electrostatic precipitators, fabric filters, and scrubbing. Because of the high collection efficiency, bag houses are used in many shipping mines. The bags are then shaken down and the coal dust is placed on conveyors to be loaded into railroad cars for shipping. Because of danger of spontaneous combustion, as little coal dust as possible is stored or stockpiled over long periods of time.

A particularly difficult dust problem arises out of the handling of calcined coke. Since the particulate calcined coke is fragile, its movement generates calcined coke dust that is collected through an air/recovery bag house system. When the bag house dumps the collected calcined coke dust, it is discharged either to a waste container or back onto the coke being transported that compounds the dust load. The disposal is difficult, cumbersome, and wasteful of an otherwise useful product whereas return of collected dust increases the likelihood of its release to the outside atmosphere.

In the following, distinction is made between:

- the carbonaceous—coal, char, and coke—particles collected in particle separation devices described earlier; this is hereafter referred to as Case A
- the carbonaceous—coal, char and coke—dust, for example in process/mining environment, which has the potential to become air-borne during loading/unloading, transportation on conveyor belts or otherwise; this is hereafter referred to as Case B.

In the past, in order to reduce the problem of coke and coal fines with reference to Case A, a variety of methods have been proposed. These prior methods are primarily off-line methods. Processes are known where coal fines are subjected to various conditions, typically high heats and/or pressure, and then mechanically compressed or formed into pellets or briquettes. Unfortunately, these processes have energy and equipment requirements that make them unattractive and expensive for most coal dust reduction applications.

A variety of methods used for producing compact coal dusts such as pellets or briquettes from coal fines involve the use of binders such as sulfite lye, urea-formaldehyde resins, phenol-formaldehyde resole resins, polyvinyl alcohol, or bitumen. However, these known processes have disadvantages. The addition of inorganic material tends to increase the ash content of the coal fines compact thus reducing the fuel value of the coal. In addition, many organic binders make the coal fins/binder mixture sticky and difficult to handle. Furthermore, the organic substances used are expensive and require particular precautions during handling.

In the case of coke dust production, the use of aqueous asphalt emulsion and surface-active agents has been proposed. Unfortunately, none of these dust control references offer a suitable solution for the recovery of coke dust. Perhaps this inadequacy is because the coke dust is neither mineral nor coal, both by definition and wetting characteristics.

As regards to Case B—essentially an on-line dust mitigation strategy—a variety of chemical mixtures, applied in the form of a spray, have been used in the past. Many of these conventional methods employ comparatively expensive chemicals. According to practitioners, the efficacy of the agglomerating mixtures is short-lived in many cases. The stability, under the wide range of ambient temperature conditions encountered in practice, has also been somewhat limited.

Therefore, a need exists for a low-cost method for the recovery and handling of coal fines—for Case A as well as Case B. Additionally, there exists a need for a system and process for agglomerating coal, coke, and more general, carbonaceous matter fines as generated from many different sources. Further, a need exists for a system of providing additives, mixed in varying proportions, for use in the recovery, suppression, and utilization of carbonaceous fines and dust in process/mining/transportation environments. Still further, there exists a need for a process having significant economic advantages over past attempts in the field in that little energy input is required and much of the process chemistry is recycled.

SUMMARY

The present invention is method for agglomerating and processing carbonaceous fines is provided. The process comprises powdering the carbonaceous fines, mixing the powdered carbonaceous fines with an organic liquid creating a slurry, adding a predetermined amount of an aqueous electrolyte to the slurry creating agglomerated particles, settling the large agglomerated particles resulting in a settled mixture of agglomerated coal fines and reagent liquor, and separating the agglomerated coal fines from the reagent liquor.

The present invention further includes a system for agglomerating and processing carbonaceous. The system comprises means for powdering the carbonaceous fines. A mixing apparatus mixes the powdered carbonaceous fines with an organic liquid with the mixed powdered carbonaceous fines and organic liquid creating a slurry. Means are provided for adding a predetermined amount of an aqueous electrolyte to the slurry creating agglomerated particles. A settler apparatus settles the large agglomerated particles resulting in a settled mixture of agglomerated coal fines and reagent liquor. Means are provided for separating the agglomerated coal fines from the reagent liquor.

BRIEF DESCRIPTION OF THE DRAWINGS

FIG. 1 is a flow chart illustrating the process for agglomerating and processing carbonaceous fines for Case A, in accordance with the present invention; and FIG. 2 is a flow chart schematically illustrating a process for agglomerating and processing carbonaceous fines for Case B, in accordance with the present invention.

DETAILED DESCRIPTION OF THE PREFERRED EMBODIMENTS

As illustrated in FIG. 1, the present invention is a system and process, indicated generally at 10, for the agglomeration of coal, coke, and more general carbonaceous matter fines. As described above, distinction is made between:

Case A—the carbonaceous—coal, char, and coke—particles collected in particle separation devices; and Case B—the carbonaceous—coal, char, and coke—dust, for example in process/mining environment, which has the potential to become air-borne during loading/unloading, transportation on conveyor belts or otherwise.

For Case A, the process of the present invention comprises collecting fines of appropriate size, slurrying the fines with agglomeration reagents and solvents, and then separating and pelletizing agglomerated coal fines, thereby removing reagent liquor from fines.

Carbonaceous matter with particulate sizes less than 0.3 (mm) millimeters are selected for treatment. It should be noted, however, that the process of the present invention can be utilized with any size particle including particles having a size equal to or greater than 0.3 (mm) millimeters. Micron-sized particulates are of special interest in dust suppression applications since such particles are not easily reclaimed from coal washery wastes due to slow sedimentation rates in disposal ponds.

The agglomeration process for Case A involves the following steps:

a) Mixing powdered carbonaceous material or particles 12 with a solution of a heavy hydrocarbon 14 with an organic liquid containing a carbonyl group in a mixer 16. The formed slurry is utilized as a vehicle for the agglomerating agent;

b) Sending the formed slurry to a settler 18 and adding to the obtained slurry a predetermined amount of an aqueous electrolyte 20 (organic or inorganic). The addition of the electrolyte immediately results in the formation of large agglomerated particles which settle within a few minutes resulting in a settled mixture of agglomerated coal fines and reagent liquor;

c) Separating the agglomerated coal fines 22 from the reagent liquor by settling or decantation. It should be noted that other types of separation including, but not limited to, centrifugation, filtration, etc., are within the scope of the present invention. The agglomerated coal fines at this stage form a sludge that can also be processed further by washing to remove the hydrocarbon-based solution if the agglomerated coal fines are intended to be disposed in a landfill. Alternatively, the separated fines can be sent to a combustion furnace;

d) Compacting, if desired, the resultant sludge product into the desired solid product shape in a compactor 24. In order to accomplish compacting, a filter press can be used. This leads to the simultaneous recovery of the hydrocarbon-based solution 26. The recovered hydrocarbon-based solution can then be recycled to the mixing device for preparation of the slurry in step a), as illustrated in FIG. 1; and e) Recycling of the liquid phase. The liquid phase recovered from the step c) can also be recycled to the mixing device for preparation of the slurry in step a), as illustrated in FIG. 1.

Generally, temperature is not a concern in the agglomeration process of the present invention, but it may have significant peripheral advantages in the recovery of the solvent and in the characteristics of the final product. Operation at room temperature will permit sufficient fluidity of the hydrocarbon-based solution and the slurry. Furthermore, operation at room temperature provides the most cost-effective recovery.

Since the treatment system and process for the agglomeration and processing of carbonaceous fines and dust 12 of the present invention renders the surface of the resultant product hydrophobic, the treated and compressed product is remarkably resistant to water absorption. The advantage of the present invention results from the ability to produce the desired product under conditions utilizing low energy and high solvent recovery.

The process of the invention disclosure is useful to agglomerate any type of carbonaceous fines. For example, the carbonaceous fines can be selected from anthracite coal, bituminous coal, coke, as well as calcined coke or carbon black.

For Case B, the solution reagents 28, described above, diluted in an aqueous medium 30, i.e., water, are sprayed onto the source of fugitive or air-borne carbonaceous dust. Additional water may be used as a carrier-fluid to reduce cost of application, as illustrated in FIG. 2. Atomizers and related spraying equipment 32 can be used if necessary to generate sufficient spray 34 dispersion and coverage. In the case of transportation using conveyor belts, application at several locations along the belt may be necessary. The application in this form will reduce fugitive dust during transportation, i.e., in rail cars, barges, etc., and also reduce the propensity for moisture readsorption and spontaneous combustion.

The following examples will serve to illustrate the invention for the preparation methods for the hydrocarbon-based solution:

EXAMPLE 1

A solution of heavy gas-oil and a molecule containing the carbonyl functionality, for example, methyl ethyl ketone, in the ratio of 1:1 were mixed with fines particle of coal dust having a size less than thirty (<30$\mu$) micron and containing less than ten (10%) percent by weight moisture. The produced slurry contains thirty-five (35%) percent by weight of coal. Addition of 50 (%) percent by weight of aqueous electrolyte (fifty (50%) percent concentration in water) was added to this mixture and, within a few minutes, large agglomerate particles settled, forming a descending interface between an upper clarified solution and a lower layer opaque liquor containing suspended matter. Within (30) minutes (or less) the agglomerated particles settle to the bottom of the container vessel forming a compact sludge. The clarified oil solvent mixture can be removed and reused. The sludge layer, containing the carbonaceous matter, can be washed and dried to give a compact solid.

EXAMPLE 2

Five hundred (500 g) grams of coke fines (less than two hundred (<200) mesh) and emulsion base (thirty-seven (37 mL) milliliters) prepared with the following composition (SAE 10W motor oil (API CC. CD-Sf): 54.3%; Water: 42.5%; Solvent: 1.0, for example, methyl ethyl ketone; and electrolyte: 2.2%) were placed into a one-gallon paint container and mixed with 3250 ml of water. The recovered fines were dried at sixty-five (650° C.) Celsius. Significant agglomeration was noted since the particle sizes were, in general greater than those corresponding to two hundred (200) mesh. Visual characterization also suggested the tendency for the solids to form clumps.

EXAMPLE 3

Coke fines (0.5 g, <200 mesh) and three (3) mL of water were treated with trace amount of Syncrude derived residue rich in pyridinic moeties, and trace amount of electrolyte. This led to a very rapid, and possibly complete, settling of coal fines suggesting strong agglomeration. The clarified solvents can be removed and reused. The sludge layer, containing the carbonaceous matter, can be washed, dried and compacted; the liquid can be recycled.

EXAMPLE 4

The solutions prepared as described in Examples 1–3 were applied in the form of a spray, using an air-brush, to piles of coal and coke fines (less than two hundred (<200) mesh). Visual examination confirmed that the tendency to generate dust was significantly lower in the presence of convective wind flow over the top of the piles of carbonaceous particles. Visual characterization also suggested the tendency for the solids to form clumps.

For the examples described, other electrolytes have been also found effective, for example sulfuric acid, phosphoric acid, sodium hydroxide, ammonia and salts solutions, as well as organic acids.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements that are disclosed herein.

What is claimed is:

1. A method for agglomerating and processing carbonaceous fines, the process comprising:
   a) powdering the carbonaceous fines;
   b) mixing the powdered carbonaceous fines with an organic liquid creating a slurry;
   c) adding a predetermined amount of an aqueous electrolyte to the slurry creating agglomerated particles;
   d) settling the large agglomerated particles resulting in a settled mixture of agglomerated coal fines and reagent liquor; and
   e) separating the agglomerated coal fines from the reagent liquor.

2. The method of claim 1 and further comprising:
   removing the reagent liquid.

3. The method of claim 2 wherein the reagent liquid is removed by washing the agglomerated coal fines.

4. The method of claim 2 and further comprising:
   recycling of the reagent liquid.

5. The method of claim 1 and further comprising:
   compacting the agglomerated coal fines into a desired solid product shape.

6. The method of claim 5 wherein the agglomerated coal fines are compacted using a filter press.

7. The method of claim 1 wherein the carbonaceous fines are selected from the group consisting of anthracite coal, bituminous coal, coke, calcined coke and carbon black.

8. The method of claim 1 wherein the organic liquid is a solution of heavy hydrocarbon containing a carbonyl-group.

9. The method of claim 1 wherein the aqueous electrolyte is selected from the group consisting of organic and inorganic.

10. The method of claim 1 wherein the agglomerated coal fines are separated from the reagent liquor by a process selected from the group consisting of settling, decantation, centrifugation, and filtration.

11. The method of claim 1 and further comprising:
    spraying the reagent liquor onto a source of air-borne carbonaceous dust.

12. The method of claim 11 and further comprising:
    adding water to the reagent liquor.

13. The method of claim 11 wherein the reagent liquor is sprayed with spraying equipment generating predetermined dispersion and coverage of the air-borne carbonaceous dust.

14. A system for agglomerating and processing carbonaceous fines utilizing the method of claim 1.

15. A system for agglomerating and processing carbonaceous fines utilizing the method of claim 2.

16. A system for agglomerating and processing carbonaceous fines utilizing the method of claim 4.

17. A system for agglomerating and processing carbonaceous comprising:
    means for powdering the carbonaceous fines:
    a mixing apparatus for mixing the powdered carbonaceous fines with an organic liquid, the mixed powdered carbonaceous fines and organic liquid creating a slurry;
    means for adding a predetermined amount of an aqueous electrolyte to the slurry creating agglomerated particles;
    a settler apparatus for settling the large agglomerated particles resulting in a settled mixture of agglomerated coal fines and reagent liquor; and
    means for separating the agglomerated coal fines from the reagent liquor.

18. The system of claim 17 and further comprising:
    means for removing the reagent liquid.

19. The system of claim 17 and further comprising:
    means for recycling of the reagent liquid.

20. The system of claim 17 and further comprising:
    a compaction apparatus for compacting the agglomerated coal fines into a desired solid product shape.

* * * * *

UNITED STATES PATENT AND TRADEMARK OFFICE
CERTIFICATE OF CORRECTION

PATENT NO. : 6,451,092 B2
DATED : September 17, 2002
INVENTOR(S) : Pradeep Agarwal et al.

It is certified that error appears in the above-identified patent and that said Letters Patent is hereby corrected as shown below:

Column 1,
Line 4, please insert after the title the following:
-- CONTRACTUAL ORIGIN OF THE INVENTION This invention was made with Government support under Contract No. DE-FC02-91ER75680 awarded by the U.S. Department of Energy. The U.S. Government has certain rights in this invention. --

Signed and Sealed this

Twenty-eighth Day of September, 2004

JON W. DUDAS
*Director of the United States Patent and Trademark Office*